(12) United States Patent
Kishiyama et al.

(10) Patent No.: US 9,276,651 B2
(45) Date of Patent: Mar. 1, 2016

(54) RADIO BASE STATION APPARATUS, MOBILE TERMINAL APPARATUS AND RADIO COMMUNICATION METHOD

(75) Inventors: Yoshihisa Kishiyama, Tokyo (JP); Kazuaki Takeda, Tokyo (JP); Hidekazu Taoka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 229 days.

(21) Appl. No.: 13/498,917

(22) PCT Filed: Oct. 5, 2010

(86) PCT No.: PCT/JP2010/067435
§ 371 (c)(1),
(2), (4) Date: May 18, 2012

(87) PCT Pub. No.: WO2011/043328
PCT Pub. Date: Apr. 14, 2011

(65) Prior Publication Data
US 2012/0218962 A1    Aug. 30, 2012

(30) Foreign Application Priority Data

Oct. 5, 2009    (JP) ................................. 2009-231962

(51) Int. Cl.
*H04B 7/04* (2006.01)
*H04B 7/06* (2006.01)
(Continued)

(52) U.S. Cl.
CPC .............. *H04B 7/0452* (2013.01); *H04B 7/024* (2013.01); *H04B 7/0645* (2013.01); *H04B 7/0632* (2013.01); *H04B 7/0639* (2013.01); *H04J 11/003* (2013.01); *H04L 1/003* (2013.01)

(58) Field of Classification Search
CPC ..... H04L 1/0026; H04L 5/0053; H04L 1/003; H04B 7/0639; H04B 7/0452; H04B 7/024

USPC ..................... 370/329, 328; 455/69
See application file for complete search history.

(56) References Cited

U.S. PATENT DOCUMENTS

2009/0046805 A1* 2/2009 Kim et al. ..................... 375/295
2009/0059844 A1* 3/2009 Ko et al. ....................... 370/328
(Continued)

FOREIGN PATENT DOCUMENTS

| JP | 2012530389 A | 11/2012 |
|---|---|---|
| WO | 2010144729 A2 | 12/2010 |

OTHER PUBLICATIONS

International Search Report w/translation from PCT/JP2010/067435 dated Jan. 11, 2011 (2 pages).
(Continued)

*Primary Examiner* — Un C Cho
*Assistant Examiner* — Fangyan Deng
(74) *Attorney, Agent, or Firm* — Osha Liang LLP

(57) ABSTRACT

To use CSI feedback information capable of sufficiently supporting MU-MIMO transmission and CoMP transmission in LTE-A systems, in a radio communication method of the invention, a radio base station apparatus (200) generates downlink transmission data including a report mode corresponding to a bandwidth to perform feedback of feedback information including channel quality information and spatial channel information, and an extension level of the feedback information, and multiplexes the downlink transmission data and a reference signal for feedback information to transmit to a mobile terminal apparatus (100), and the mobile terminal apparatus (100) receives a downlink signal including the report mode and the extension level, and generates feedback information associated with the report mode and the extension level to transmit to the radio base station apparatus (200).

5 Claims, 10 Drawing Sheets

(51) Int. Cl.
*H04L 1/00* (2006.01)
*H04J 11/00* (2006.01)
*H04B 7/02* (2006.01)

(56) References Cited

U.S. PATENT DOCUMENTS

| | | | |
|---|---|---|---|
| 2010/0041344 A1* | 2/2010 | Kim et al. | 455/69 |
| 2010/0272019 A1* | 10/2010 | Papasakellariou et al. | 370/328 |
| 2011/0004799 A1* | 1/2011 | Shimanuki et al. | 714/749 |
| 2011/0013710 A1* | 1/2011 | Xiao | 375/260 |
| 2011/0134771 A1* | 6/2011 | Chen et al. | 370/252 |

OTHER PUBLICATIONS

3GPP TR 36.213 V. 9.2.0; "3rd Generation Partnership Project; Technical Specification Group Radio Access Network; Evolved Universal Terrestrial Radio Access (E-UTRA); Physical layer procedures (Release 9)", Jun. 2010 (80 pages).

Office Action in corresponding Japanese application No. 2013-033301 dated Apr. 23, 2013 (4 pages).

* cited by examiner

| CQI | | SPATIAL CHANNEL INFORMATION | WITHOUT FEEDBACK | WIDEBAND | | SUB-BAND | |
|---|---|---|---|---|---|---|---|
| | | | | SHORT-PERIOD AVERAGE | LONG-PERIOD AVERAGE | SHORT-PERIOD AVERAGE | LONG-PERIOD AVERAGE |
| | WIDEBAND CQI | | | | | | |
| | SUB-BAND CQI (UE SELECTION) | | MODE 2-0 | | | MODE 1-2 | |
| | SUB-BAND CQI (HIGHER LAYER) | | MODE 3-0 (B) | MODE 3-1 | (A) | MODE 2-2 (C) | |

FIG.4

RADIO BASE STATION APPARATUS, MOBILE TERMINAL APPARATUS AND RADIO COMMUNICATION METHOD

TECHNICAL FIELD

The present invention relates to a radio base station apparatus, mobile terminal apparatus and radio communication method.

BACKGROUND ART

In LTE (Long Term Evolution) systems specified by the 3GPP ($3^{rd}$ Generation Partnership Project), in order to actualize faster transmission, MIMO (Multiple Input Multiple Output) transmission is adopted in which a radio base station apparatus uses a plurality of reception antennas. By using this MIMO transmission, it is possible to perform scheduling in the spatial domain, in addition to scheduling in the time domain and frequency domain. As MIMO transmission, there are single user MIMO (SU-MIMO) in which a radio base station apparatus having a plurality of antennas parallel transmits a plurality of signals to a single user (mobile terminal apparatus), and multi-user MIMO in which a radio base station apparatus having a plurality of antennas performs spatial multiplexing to transmit to a plurality of users (mobile terminal apparatuses) (SDMA: Space Division Multiple Access). In this MIMO transmission, a PMI (Precoder Matrix Indicator) indicative of a transmission weight for each antenna is used in downlink transmission.

In LTE systems, scheduling in the time domain, frequency domain and spatial domain is dependent on channel states in downlink. Therefore, for scheduling in the time domain, frequency domain and spatial domain in the radio base station apparatus, mobile terminal apparatuses report channel states. As a parameter to report the channel state, there are the above-mentioned PMI, and downlink quality information (CQI: Channel Quality Indicator) used in adaptive modulation/demodulation and coding processing (AMC: Adaptive Modulation and Coding scheme). By transmitting such PMI and CQI (Channel State Information: CSI or feedback information) to the radio base station apparatus as feedback, the radio base station apparatus performs scheduling in the time domain, frequency domain and spatial domain.

CITATION LIST

Non-Patent Literature

[Non-patent Literature 1] 3GPP, TS36.213

SUMMARY OF INVENTION

Technical Problem

In the 3GPP, LTE-A (LTE-Advanced) systems are studied to actualize high-speed transmission in wider coverage than in LTE systems. In the LTE-A systems, it is scheduled to adopt Coordinated Multiple Point Transmission/Reception (CoMP) as measures for improving reception quality in cell-edge users. Also in this CoMP transmission, the CQI to use AMC is used in downlink transmission.

In the LTE systems, the CSI is specified mainly to support SU-MIMO transmission, but it is conceivable that the CSI is not capable of supporting MU-MIMO transmission and CoMP transmission sufficiently. Therefore, it is required actualizing a radio communication method using CSI feedback information capable of sufficiently supporting MU-MIMO transmission and CoMP transmission in the LTE-A systems.

The present invention was made in view of such a respect, and it is an object of the invention to provide a radio base station apparatus, mobile terminal apparatus and radio communication method using CSI feedback information capable of sufficiently supporting MU-MIMO transmission and CoMP transmission in LTE-A systems.

Solution to Problem

A radio base station apparatus of the invention is characterized by having downlink transmission data generating means for generating downlink transmission data including a report mode corresponding to a bandwidth to perform feedback of feedback information including channel quality information and spatial channel information, and an extension level of the feedback information, and multiplexing means for multiplexing the downlink transmission data and a reference signal for feedback information.

A mobile terminal apparatus of the invention is characterized by having receiving means for receiving a downlink signal including a report mode corresponding to a bandwidth to perform feedback of feedback information including channel quality information and spatial channel information, and an extension level of the feedback information, and feedback information generating means for generating feedback information associated with the report mode and the extension level.

A radio communication method of the invention is characterized by having the steps in a radio base station apparatus of generating downlink transmission data including a report mode corresponding to a bandwidth to perform feedback of feedback information including channel quality information and spatial channel information, and an extension level of the feedback information, and multiplexing the downlink transmission data and a reference signal for feedback information to transmit to a mobile terminal apparatus, and the steps in the mobile terminal apparatus of receiving a downlink signal including the report mode and the extension level, and generating feedback information associated with the report mode and the extension level to transmit to the radio base station apparatus.

Technical Advantage of the Invention

According to the invention, used is the extended feedback information including the channel quality information and the spatial channel information, and therefore, it is possible to adequately support MU-MIMO transmission and CoMP transmission in LTE-A systems.

BRIEF DESCRIPTION OF DRAWINGS

FIG. 4 is a diagram to explain report modes of a radio communication method according to the Embodiment of the invention;

DESCRIPTION OF EMBODIMENTS

An Embodiment of the invention will specifically be described below with reference to accompanying drawings.

Figure 1:
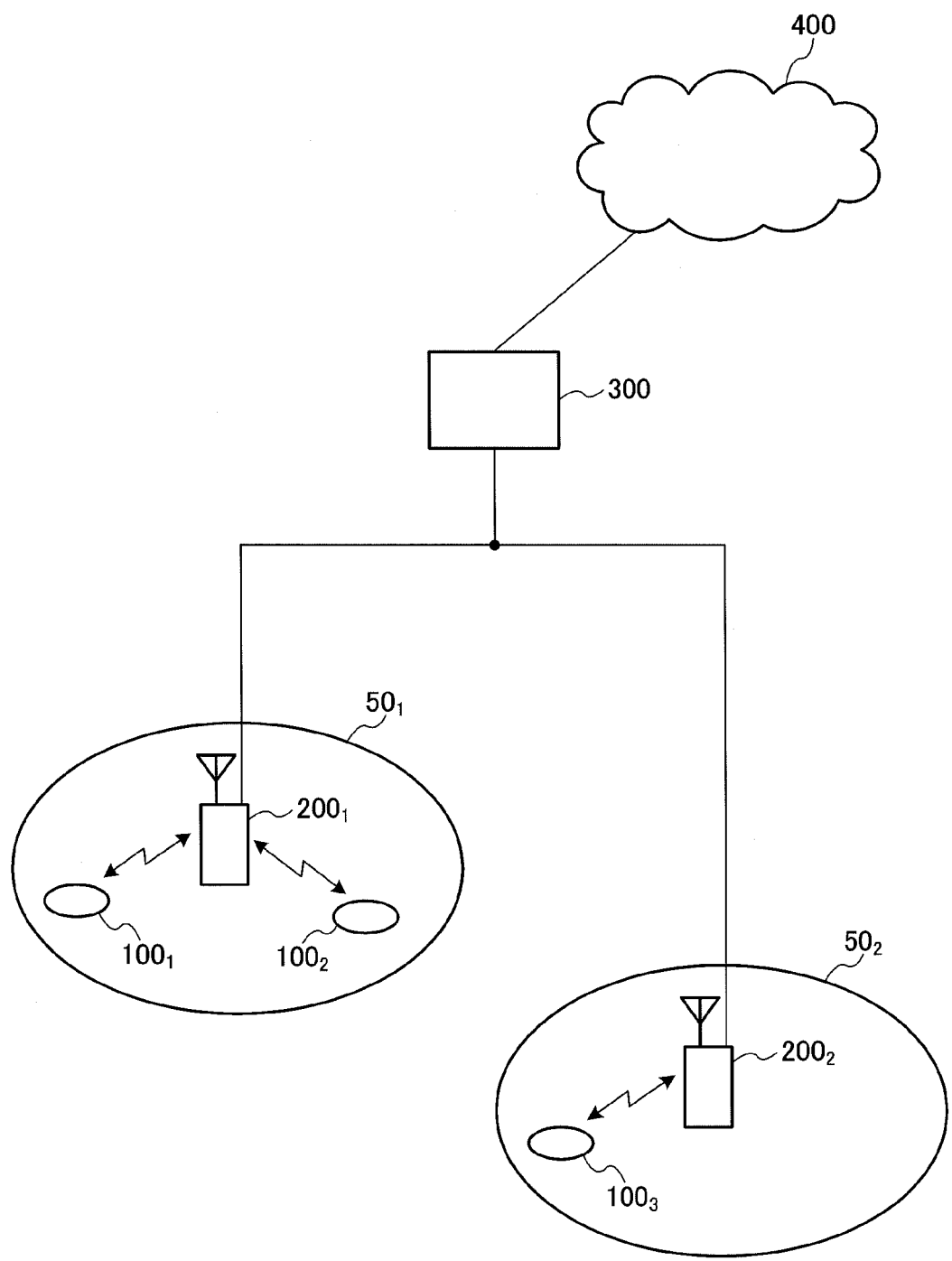
FIG. 1 is a diagram illustrating a radio communication system having radio base station apparatuses and mobile terminal apparatuses according to an Embodiment of the invention.

FIG. 1 is a diagram illustrating a radio communication system having radio base station apparatuses and mobile terminal apparatuses according to the Embodiment of the invention.

The radio communication system is a system to which, for example, E-UTRA (Evolved UTRA and UTRAN) is applied. The radio communication system is provided with base station apparatuses (eNB: eNodeB) $200$ ($200_1$, $200_2$, $200_3$, ..., $200_l$, l is an integer where l>0) and a plurality of mobile terminals (UE) $100_n$ ($100_1$, $100_2$, $100_3$, ..., $100_n$, n is an integer where n>0) that communicate with the base station apparatuses $200$. The base station apparatus $200$ is connected to an upper station, for example, an access gateway apparatus $300$, and the access gateway apparatus $300$ is connected to a core network $400$. The mobile terminal $100_n$ communicates with the base station apparatus $200$ in a cell $50$ ($50_1$, $50_2$) by E-UTRA. This Embodiment shows two cells, but the invention is similarly applied to three cells or more. In addition, each of the mobile terminals ($100_1$, $100_2$, $100_3$, ..., $100_n$) has the same configuration, function and state, and is described as a mobile terminal $100_n$ unless otherwise specified in the following description.

In the radio communication system, as a radio access scheme, OFDM (Orthogonal Frequency Division Multiplexing) is applied in downlink, while SC-FDMA (Single-Carrier Frequency Division Multiple Access) is applied in uplink. Herein, OFDM is a multicarrier transmission system for dividing a frequency band into a plurality of narrow frequency bands (subcarriers), and mapping data to each subcarrier to perform communication. SC-FDMA is a single-carrier transmission system for dividing the system band for each terminal so that a plurality of terminals uses mutually different bands, and thereby reducing interference among the terminals.

Described herein are communication channels in E-UTRA.

In downlink, used are the Physical Downlink Shared Channel (PDSCH) shared among the mobile terminals $100_n$, and the Physical Downlink Control Channel (PDCCH). The Physical Downlink Control Channel is also called the downlink L1/L2 control channel. User data i.e. normal data signals are transmitted on the Physical Downlink Shared Channel. Meanwhile, on the Physical Downlink Control Channel are transmitted downlink scheduling information (DL Scheduling Information), acknowledgement/negative acknowledgement information (ACK/NACK), uplink scheduling grant (UL Scheduling Grant), TPC command (Transmission Power Control Command), etc. For example, the downlink scheduling information includes an ID of a user to perform communications using the Physical Downlink Shared Channel, information of a transport format of the user data, i.e. information on the data size, modulation scheme, and retransmission control (HARQ: HybridARQ), downlink resource block assignment information, etc.

Meanwhile, for example, the uplink scheduling grant includes an ID of a user to perform communications using the Physical Uplink Shared Channel, information of a transport format of the user data, i.e. information on the data size and modulation scheme, uplink resource block assignment information, information on transmission power of the uplink shared channel, etc. Herein, the uplink resource block corresponds to frequency resources, and is also called the resource unit.

Further, the acknowledgement/negative acknowledgement information (ACK/BACK) is acknowledgement/negative acknowledgement information concerning the shared channel in uplink. The content of acknowledgement/negative acknowledgement information is expressed by Acknowledgement (ACK) indicating that the transmission signal is properly received or Negative Acknowledgement (NACK) indicating that the transmission signal is not properly received.

In uplink, used are the Physical Uplink Shared Channel (PUSCH) shared among the mobile terminals $100_n$, and the Physical Uplink Control Channel (PUCCH). User data i.e. normal data signals are transmitted on the Physical Uplink Shared Channel. Meanwhile, on the Physical Uplink Control Channel is transmitted downlink quality information used in scheduling processing of the physical shared channel in downlink and adaptive modulation/demodulation and coding processing, and acknowledgement/negative acknowledgement information of the Physical Downlink Shared Channel.

On the Physical Uplink Control Channel, a scheduling request to request resource allocation of the uplink shared channel, release request in persistent scheduling and the like may be transmitted, in addition the CQI and acknowledgement/negative acknowledgement information. Herein, resource allocation of the uplink shared channel means that a base station apparatus notifies a mobile terminal that the mobile terminal is allowed to perform communications using an uplink shared channel in a subsequent subframe, using the Physical Downlink Control Channel in some subframe.

The mobile terminal $100_n$ communicates with an optimal base station apparatus. In the example of FIG. 1, mobile terminals $100_1$ and $100_2$ communicate with a base station apparatus $200_1$, and a mobile terminal $100_3$ communicates with a base station apparatus $200_2$.

Figure 2:
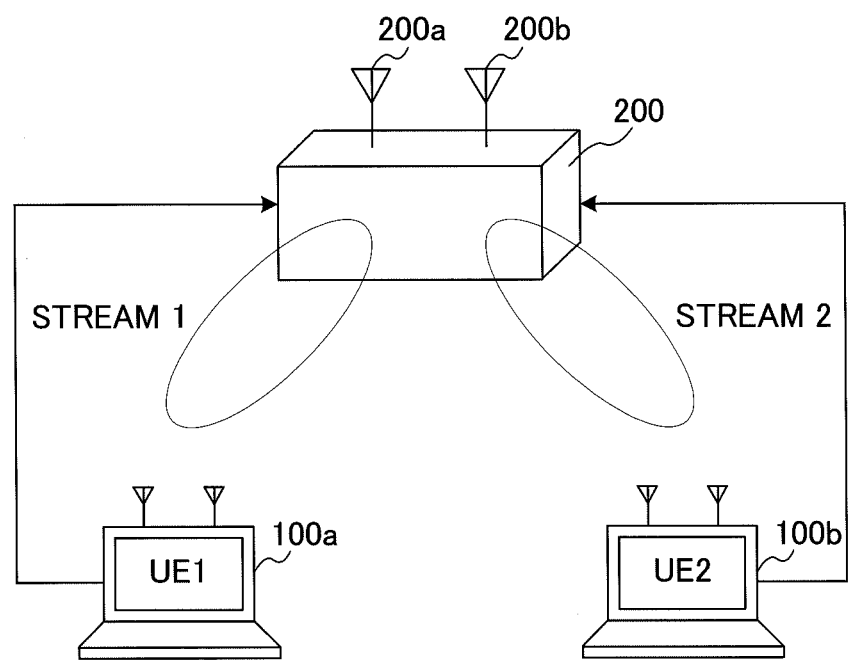
FIG. 2 is a diagram to explain MU-MIMO transmission.

When MU-MIMO transmission is performed in the radio communication system with such a configuration, as shown in FIG. 2, the base station apparatus $200$ performs spatial multiplexing to transmit data to a plurality of mobile terminals $100a$ and $100b$. In other words, the base station apparatus $200$ has antennas $200a$ and $200b$, and transmits a signal (stream 1) to the mobile terminal $100a$ from the antenna $200a$, while transmitting a signal (stream 2) to the mobile terminal $100b$ from the antenna $200b$. At this point, the signal transmitted from the antenna $200a$ and the signal transmitted from the antenna $200b$ are spatially multiplexed.

In MU-MIMO transmission, the base station apparatus 200 transmits CSI reference signals (CSI-RS) to the mobile terminals 100a and 100b in downlink, and the mobile terminals 100a and 100b transmit PMIs selected from spatial channel states to the base station apparatus 200 in uplink. Then, the base station apparatus 200 generates transmission weights based on the PMIs subjected to feedback.

Further, in the LTE-A systems, as described above, CoMP transmission is studied as measures for improving reception quality in cell-edge users. This CoMP transmission is broadly divided into Joint Processing (JP) and Coordinated Scheduling/Beamforming (CS/CB). Further, JP is classified into Joint Transmission (JT) and Dynamic Cell Selection (DCS).

Figure 3:
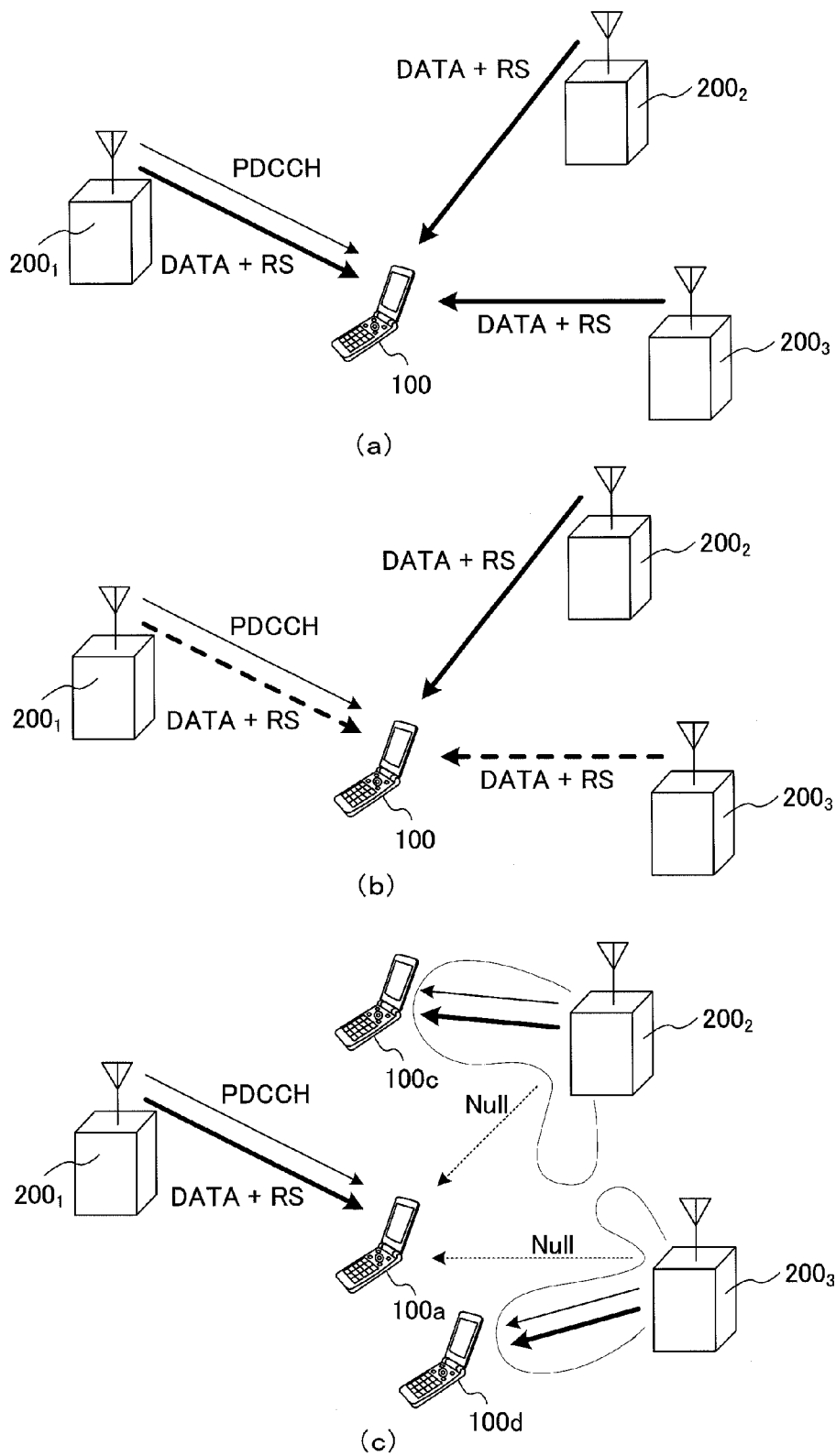
FIGS. 3(*a*) to 3(*c*) are diagrams to explain CoMP transmission.

As shown in FIGS. 3(a) and 3(b), JP in CoMP transmission is a method in which only the base station apparatus $200_1$ in a serving cell transmits a PDCCH signal and base station apparatuses $200_2$ and $200_3$ in neighboring cells other than the base station apparatus $200_1$ in the serving cell are also capable of transmitting data and demodulation reference signals (DM-RS). Then, JT is the method in which the data and DM-RS is simultaneously transmitted from the base station apparatus $200_1$ in the serving cell and base station apparatuses $200_2$ and $200_3$ in neighboring cells (FIG. 3(a)), and DCS is a method in which the data and DM-RS is transmitted from a base station apparatus (base station apparatus $200_2$ in FIG. 3(b)) in the cell of the best spatial channel state at the time of transmission. DCS is particularly useful in improving throughput in cell-edge users.

As shown in FIG. 3(c), CS/CB in CoMP transmission is a method in which only the base station apparatus $200_1$ in the serving cell transmits a PDCCH signal, data and DM-RS, and the base station apparatuses $200_2$ and $200_3$ in neighboring cells increase the reception SINR of the mobile terminal by scheduling and beamforming. In other words, when the base station apparatus $200_1$ in the serving cell transmits a signal, resource blocks (RBs) are selected and/or beamforming is performed so that the base station apparatuses $200_2$ and $200_3$ in neighboring cells do not transmit any signals (the base station apparatuses $200_2$ and $200_3$ do not transmit any signals to the mobile terminal 100a and respectively transmit signals to other mobile terminals 100c and 100d). CS/CB is also useful particularly in improving throughput in cell-edge users.

In the LTE systems, the CQI and PMI are defined as CSI feedback information to transmit to the radio base station apparatus as feedback. The CSI feedback information is information to support mainly SU-MIMO. Further, in the LTE systems, in transmitting the CSI as feedback, report modes corresponding to combinations of feedback bandwidths respectively of the CQI and PMI are defined. This report mode is provided by Higher layer signaling for each mobile terminal apparatus.

To sufficiently support MU-MIMO transmission and CoMP transmission in the LTE-A systems, it is conceivable that the above-mentioned CSI feedback information and report modes are not capable of sufficiently supporting. Therefore, the inventors of the invention propose changing the definition of the CSI feedback information to support MU-MIMO transmission and CoMP transmission.

To support MU-MIMO transmission and CoMP transmission, the number of pieces of CSI feedback information to perform feedback also increases. Further, since the bandwidths to perform feedback of the CSI feedback information are different respectively in the different report modes, environments for performing feedback of the feedback information are different for each report mode. Therefore, in considering supporting MU-MIMO transmission and CoMP transmission, it is necessary to set an optimal format of feedback information in each report mode. From such a viewpoint, the inventors of the invention propose defining (extending) the CSI feedback information most suitable for the report mode.

In the invention, the CSI feedback information is defined as a combination of the CQI and spatial channel information. In addition, the spatial channel information is of the concept that the PMI is extended, and the PMI is a kind of spatial channel information. Then, the level of extension of the CSI feedback information is changed corresponding to the information amount of the spatial channel information for MU-MIMO transmission. In other words, as the information amount of spatial channel information for MU-MIMO increases, the extension level is assumed to be higher. Herein, for example, an increase in the information amount of spatial channel information for MU-MIMO transmission means an increase in the number of bits of PMI, and using explicit feedback information (for example, direct channel matrix) and covariance matrix, instead of implicit feedback information such as the PMI.

Alternatively, the level of extension of the CSI feedback information is changed corresponding to the form (CS/CB, DCS, JT) of CoMP transmission. In other words, the extension level is low when the form of CoMP transmission is CS/CB, the extension level is higher than in the case of CS/CB when the form of CoMP transmission is DCS, and the extension level is higher than in the case of DCS when the form of CoMP transmission is JT.

FIG. 4 is a diagram to explain report modes of CSI feedback information in a radio communication method according to the Embodiment of the invention. The CSI feedback information includes a wideband CQI that the feedback bandwidth is a wide band (entire system band), a sub-band CQI that the feedback bandwidth is a sub-band (part of the system band (for example, component carrier)) and that a mobile terminal apparatus selects, and another sub-band CQI that the feedback bandwidth is a sub-band and that a higher layer notifies. Meanwhile, the spatial channel information includes information without feedback (without undergoing MIMO transmission), wideband spatial channel information that the feedback bandwidth is a wide band and that the averaging time of the spatial channel information is a short period, another wideband spatial channel information that the feedback bandwidth is a wide band and that the averaging time of the spatial channel information is a long period, sub-band spatial channel information that the feedback bandwidth is a sub-band and that the averaging time of the spatial channel information is a short period, and another sub-band spatial channel information that the feedback bandwidth is a sub-band and that the averaging time of the spatial channel information is a long period. The report modes in the radio communication method according to the invention are defined by combinations of the above-mentioned CQI and the above-mentioned spatial channel information. In addition, the report modes as shown in FIG. 4 are of an example, and the report modes in the invention are not limited to FIG. 4.

In FIG. 4, the case of report mode 3-1 (report mode shown by (A) i.e. the sub-band CQI (higher layer), wideband spatial channel information) is of an environment in which the antenna correlation of the radio base station apparatus is relatively high. Meanwhile, the case of mode 2-0 (report mode shown by (B) i.e. the sub-band CQI (UE selection), without feedback) and the case of mode 3-0 (report mode shown by (B) i.e. the sub-band CQI (higher layer), without feedback) are the same as the report mode of the feedback information in the LTE system. Further, the case of mode 1-2

(report mode shown by (C) i.e. the wideband CQI, sub-band spatial channel information (short-period average)) and the case of mode 2-2 (report mode shown by (C) i.e. the sub-band CQI (UE selection), sub-band spatial channel information (short-period average)) are of an environment in which the antenna correlation of the radio base station apparatus is relatively low.

Thus, since the environments are different from each other corresponding to the report modes, it is necessary to select a format (extension format) of the CSI feedback information associated with each report mode. For example, in the case where the report mode shown in FIG. 4 is mode 3-1, it is desirable to select formats as shown in FIGS. 5(a) to 5(d). The formats as shown in FIGS. 5(a) to 5(d) support extension from the viewpoint of the form of CoMP transmission.

In mode 3-1, in the case of performing MU-MIMO transmission in a single cell, as shown in FIG. 5(a), the CSI feedback information is of a combination of the sub-band CQI and the wideband covariance matrix. Since the covariance matrix is explicit feedback information, the spatial channel information for MU-MIMO transmission is extended.

In mode 3-1, in the case of supporting CS/CB CoMP transmission, since the spatial channel information of a neighboring cell other than the serving cell is also required, as shown in FIG. 5(b), the CSI feedback information is of a combination of the sub-band CQI for the serving cell (#1), the wideband covariance matrix for the serving cell (#1) and the wideband covariance matrix for the neighboring cell (#2 . . . ).

In mode 3-1, in the case of supporting DCS CoMP transmission, since the spatial channel information of a neighboring cell other than the serving cell is also required, and the quality information of the neighboring cell is further required, as shown in FIG. 5(c), the CSI feedback information is of a combination of the sub-band CQI for the serving cell (#1), the wideband covariance matrix for the serving cell (#1), the sub-band CQI for the neighboring cell (#2 . . . ), and the wideband covariance matrix for the neighboring cell (#2 . . . ).

In mode 3-1, in the case of supporting JT CoMP transmission, since the spatial channel information of a neighboring cell other than the serving cell is also required, the quality information of the neighboring cell is also required, and the PMI (sub-band) (assist information) between cells is further required to achieve synchronized transmission between cells, as shown in FIG. 5(d), the CSI feedback information is of a combination of the sub-band CQI for the serving cell (#1), the wideband covariance matrix for the serving cell (#1), the inter-cell PMI (sub-band), the sub-band CQI for the neighboring cell (#2 . . . ), and the wideband covariance matrix for the neighboring cell (#2 . . . ).

As shown in FIGS. 5(a) to 5(d), the feedback information of the higher extension level includes the feedback information of the lower extension level. In other words, the format as shown in FIG. 5(b) includes the format as shown in FIG. 5(a), and is provided with the wideband covariance matrix for the neighboring cell (#2 . . . ). Further, the format as shown in FIG. 5(c) includes the format as shown in FIG. 5(b), and is provided with the sub-band CQI for the neighboring cell (#2 . . . ). Furthermore, the format as shown in FIG. 5(d) includes the format as shown in FIG. 5(c), and is provided with the inter-cell PMI (sub-band) (assist information). By defining such format configurations, in using the format of the feedback information of the higher extension level, the format is capable of serving as the format of the feedback information of the lower extension level.

Further, in the case where the report mode as shown in FIG. 4 is mode 3-1, it is desirable to select formats as shown in FIGS. 6(a) to 6(d). The formats as shown in FIGS. 6(a) to 6(d) support extension from the viewpoint of the PMI.

In mode 3-1, in the case of performing SU-MIMO transmission in a single cell, as shown in FIG. 6(a), the CSI feedback information is of a combination of the sub-band CQI and the wideband PMI. The feedback information is the format used in the LTE system.

In mode 3-1, in the case of supporting CS CoMP transmission, as shown in FIG. 6(b), the CSI feedback information is of a combination of the sub-band CQI for the serving cell (#1) and the wideband PMI for the serving cell (#1).

In mode 3-1, in the case of supporting DCS CoMP transmission, since the spatial channel information of a neighboring cell other than the serving cell is also required, and the quality information of the neighboring cell is further required, as shown in FIG. 6(c), the CSI feedback information is of a combination of the sub-band CQI for the serving cell (#1), the wideband PMI for the serving cell (#1), the sub-band CQI for the neighboring cell (#2 . . . ), and the wideband PMI for the neighboring cell (#2 . . . ).

In mode 3-1, in the case of supporting JT CoMP transmission, since the spatial channel information of a neighboring cell other than the serving cell is also required, the quality information of the neighboring cell is also required, and the PMI (sub-band) (assist information) between cells is further required to achieve synchronized transmission between cells, as shown in FIG. 6(d), the CSI feedback information is of a combination of the sub-band CQI for the serving cell (#1), the wideband PMI for the serving cell (#1), the inter-cell PMI (sub-band), the sub-band CQI for the neighboring cell (#2 . . . ), and the wideband PMI for the neighboring cell (#2 . . . ).

As shown in FIGS. 6(a) to 6(d), the feedback information of the higher extension level includes the feedback information of the lower extension level. In other words, the format as shown in FIG. 6(b) includes the format as shown in FIG. 6(a). Further, the format as shown in FIG. 6(c) includes the format as shown in FIG. 6(b), and is provided with the sub-band CQI for the neighboring cell (#2 . . . ) and the wideband PMI for the neighboring cell (#2 . . . ). Furthermore, the format as shown in FIG. 6(d) includes the format as shown in FIG. 6(c), and is provided with the inter-cell PMI (sub-band) (assist information). By defining such format configurations, in using the format of the feedback information of the higher extension level, the format is capable of serving as the format of the feedback information of the lower extension level.

In the case where the report mode as shown in FIG. 4 is mode 2-0 and mode 3-0, it is desirable to select formats as shown in FIGS. 7(a) to 7(d). The formats as shown in FIGS. 7(a) to 7(d) are the formats used in the LTE system and the formats without being extended.

In mode 2-0 and mode 3-0, in the case of supporting feedback in a single cell, as shown in FIG. 7(a), the CSI feedback information is the sub-band CQI. Further, in mode 2-0 and mode 3-0, in the case of supporting CS/CB CoMP transmission, as shown in FIG. 7(b), the CSI feedback information is the sub-band CQI for the serving cell (#1).

In mode 2-0 and mode 3-0, in the case of supporting DCS CoMP transmission, since the quality information of a neighboring cell other than the serving cell is also required, as shown in FIG. 7(c), the CSI feedback information is of a combination of the sub-band CQI for the serving cell (#1), and the sub-band CQI for the neighboring cell (#2 . . . ).

In mode 2-0 and mode 3-0, in the case of supporting JT CoMP transmission, since the quality information of a neighboring cell is also required, and the PMI (sub-band) (assist information) between cells is further required to achieve synchronized transmission between cells, as shown in FIG. 7(d), the CSI feedback information is of a combination of the sub-band CQI for the serving cell (#1), the inter-cell PMI (sub-band), and the sub-band CQI for the neighboring cell (#2 . . . ).

As shown in FIGS. 7(a) to 7(d), the feedback information of the higher extension level includes the feedback information of the lower extension level. In other words, the format as shown in FIG. 7(b) includes the format as shown in FIG. 7(a). Further, the format as shown in FIG. 7(c) includes the format as shown in FIG. 7(b), and is provided with the sub-band CQI for the neighboring cell (#2 . . . ). Furthermore, the format as shown in FIG. 7(d) includes the format as shown in FIG. 7(c), and is provided with the inter-cell PMI (sub-band) (assist information). By defining such format configurations, in using the format of the feedback information of the higher extension level, the format is capable of serving as the format of the feedback information of the lower extension level.

When the report mode as shown in FIG. 4 is mode 1-2 and mode 2-2, in the case of performing MU-MIMO transmission in a single cell, as shown in FIG. 8(a), the CSI feedback information is of a combination of the wideband CQI or sub-band CQI, and the sub-band direct channel matrix. Since the direct channel matrix is the explicit feedback information, the spatial channel information for MU-MIMO transmission is extended.

In mode 1-2 and mode 2-2, in the case of supporting CoMP transmission of CB, DCS, or JT, since the spatial channel information of a neighboring cell other than the serving cell is also required, as shown in FIG. 8(b), the CSI feedback information is of a combination of the wideband CQI or sub-band CQI for the serving cell (#1), the sub-band direct channel matrix for the serving cell (#1), and the sub-band direct channel matrix for the neighboring cell (#2 . . . ).

As shown in FIGS. 8(a) and 8(b), the feedback information of the higher extension level includes the feedback information of the lower extension level. In other words, the format as shown in FIG. 8(b) includes the format as shown in FIG. 8(a), and is provided with the sub-band direct channel matrix for the neighboring cell (#2 . . . ). By defining such format configurations, in using the format of the feedback information of the higher extension level, the format is capable of serving as the format of the feedback information of the lower extension level.

In the case of using the above-mentioned formats of feedback information, it is conceivable that the need for changing definition of the CQI arises. In other words, in order to accurately perform MU-MIMO transmission, scheduling for CoMP transmission, and link adaptation (transmission power control and control of transmission rate), it is necessary to recalculate the CQI (Signal to Interference Noise Ratio: SINR) subjected to feedback. Therefore, it is necessary to define the CQI that facilitates recalculation.

Figure 9:
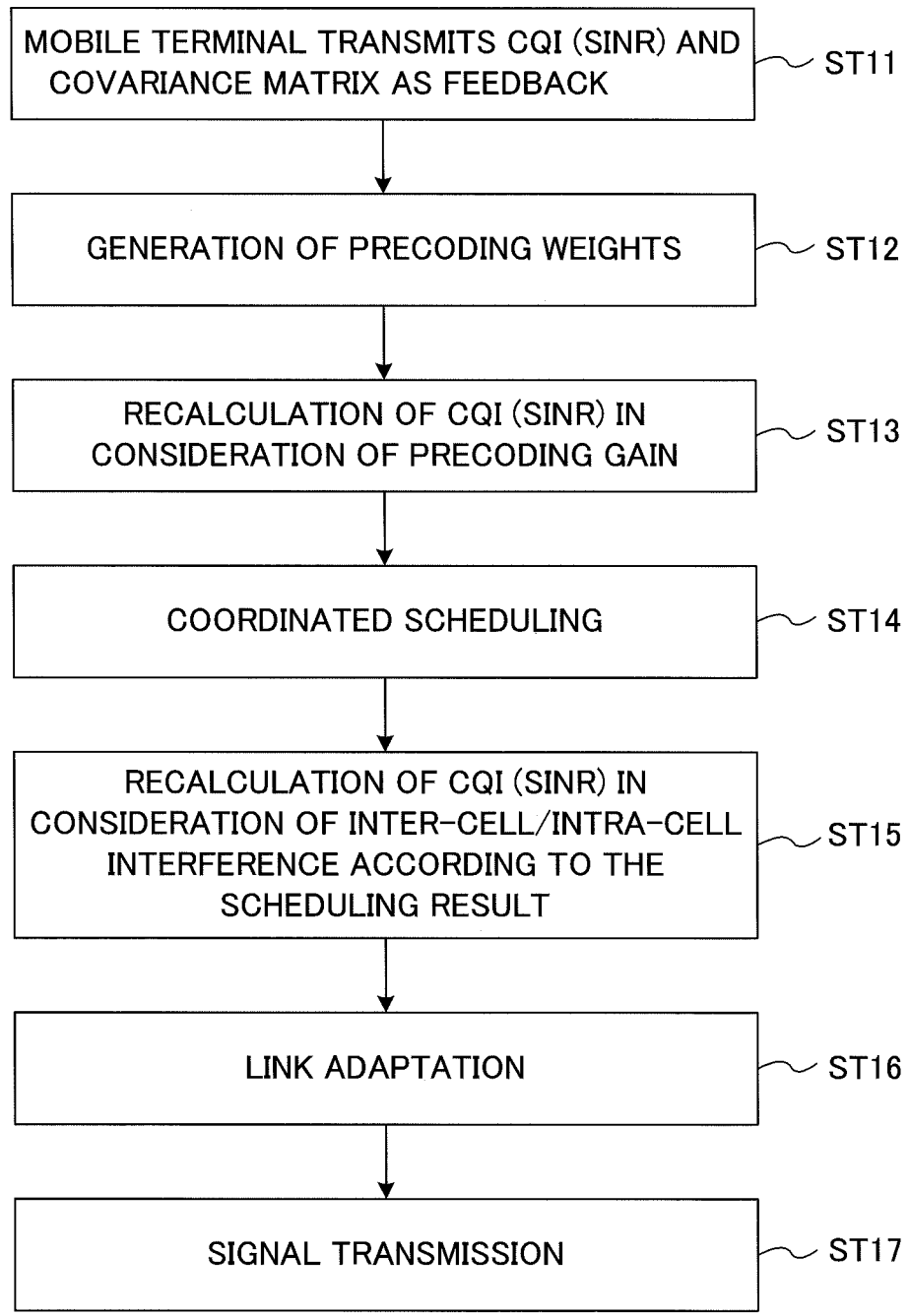
FIG. 9 is a diagram to explain recalculation of a CQI (SINR) in the radio base station apparatus according to the Embodiment of the invention.

For example, in the case of performing feedback of the above-mentioned feedback information, as shown in FIG. 9, first, the mobile terminal transmits the CQI (SINR) and covariance matrix as feedback (ST11). The base station apparatus generates precoding weights using the CQI (ST12). At this point, in precoding weight generation, since precoding gain is multiplied by the covariance matrix that is explicit spatial channel information, the multiplied SINR is different from the CQI (SINR) subjected to feedback. Therefore, the CQI (SINR) is recalculated for correction due to the precoding gain multiplication (ST13).

Next, coordinated scheduling is performed for CoMP transmission (ST14). By this coordinated scheduling, the level of interference is changed. Therefore, according to the scheduling result, the CQI (SINR) is recalculated in consideration of inter-cell interference/intra-cell interference (ST15). Subsequently, link adaptation is performed based on the recalculated CQI (SINR) (ST16), and the signal is transmitted (ST17).

In considering the CQI that is suitable for recalculation as described above, it is important (1) whether to consider precoding gain, (2) whether to consider intra-cell interference in MU-MIMO transmission, and (3) whether to consider interference from the cell within the CoMP reporting set i.e. the set of cells coordinating for CoMP transmission.

Regarding (1), there is a scheme for (1-1) including gain such that the CQI is of the best precoding weights, and there is a scheme for using the PMI that is implicit spatial channel feedback. This scheme is adopted in the LTE system. Meanwhile, there is a scheme for (1-2) generating the CQI without considering the precoding weights, and for example, there is a scheme for using average channel gain of a plurality of antennas. This scheme can be a candidate for the explicit spatial channel feedback.

Regarding (2), there is a scheme for (2-1) regarding intra-cell interference in MU-MIMO transmission as being not interference. This scheme is adopted in the LTE system. Meanwhile, there is a scheme for regarding intra-cell interference in MU-MIMO transmission as being interference. In this case, a quantization error is approximated as intra-cell interference.

Regarding (3), there is a scheme for (3-1) not considering interference from the cell within the set of cells coordinating for CoMP. Further, there is a scheme for (3-2) regarding interference in a state without the precoding effect as being interference from the cell within the set of cells coordinating for CoMP, and for example, there is a scheme for using average channel gain of a plurality of antennas. Furthermore, there is a scheme for (3-3) handling interference of the cell within the set of cells coordinating for CoMP and interference of the cell that does not coordinate for CoMP in the same manner. Among these schemes, (3-1) and (3-2) are preferable, in consideration of the precoding weights and scheduling result.

Figure 10:
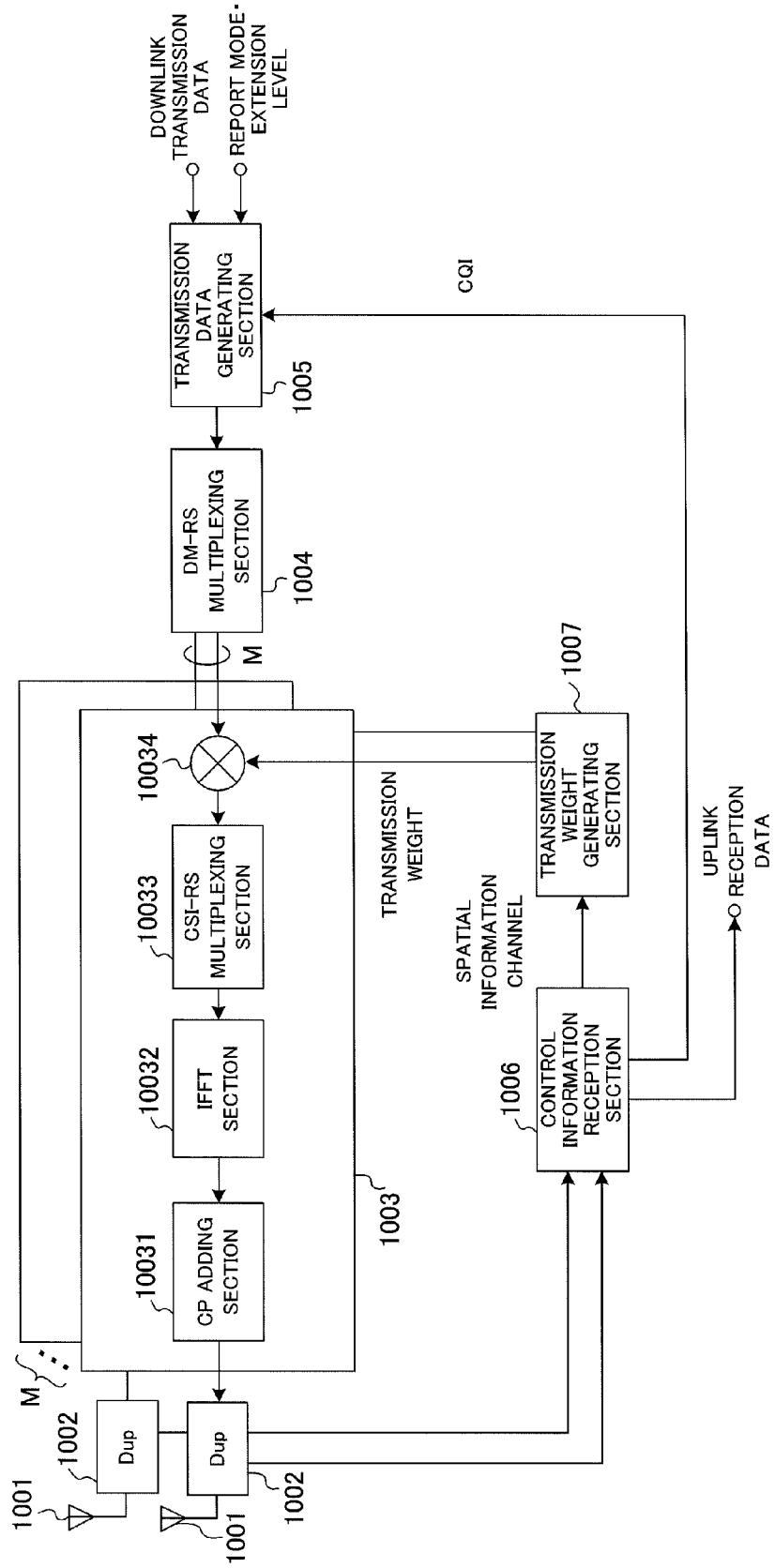
FIG. 10 is a block diagram illustrating a schematic configuration of the radio base station apparatus according to the Embodiment of the invention.

FIG. 10 is a diagram illustrating a configuration of a radio base station apparatus according to the Embodiment of the invention. Described herein is the case of performing MU-MIMO transmission. The radio base station apparatus as shown in FIG. 10 is mainly comprised of a plurality of antennas 1001, duplexers 1002 that switch between transmission and reception, transmission signal processing sections 1003 corresponding to the number of antennas, a DM-RS multiplexing section 1004 that multiplexes a demodulation reference signal (DM-RS) into transmission data, a transmission data generating section 1005 that generates the transmission data, a control information reception section 1006 that receives control information of an uplink signal, and a transmission weight generating section 1007 that generates transmission weights based on spatial channel information.

Each of the transmission signal processing sections 1003 has a multiplier 10034 that multiplies a transmission signal by a transmission weight, a CSI-RS multiplexing section 10033 that multiplexes a channel state information reference signal (SCI-RS) into the transmission signal, an IFFT section 10032 that performs Inverse Fast Fourier transform (IFFT) operation on the multiplexed signal, and a CP adding section 10031 that adds a CP (Cyclic Prefix) to the IFFT-processed signal.

The transmission data generating section 1005 generates transmission data from at least downlink transmission data, a report mode corresponding to a bandwidth to perform feedback of feedback information, and an extension level of the feedback information. Herein, the feedback information includes the channel quality information (CQI) and the spatial channel information. The transmission data generating section 1005 outputs the transmission data to the DM-RS multiplexing section 1004. The DM-RS multiplexing section 1004 multiplexes the transmission data and DM-RS to output to each of the transmission signal processing sections 1003.

The multiplier 10034 in each of the transmission signal processing sections 1003 multiplies the transmission data by a transmission weight. The transmission signal multiplied by the transmission weight is output to the CSI-RS multiplexing section 10033. The CSI-RS multiplexing section 10033 multiplexes a reference signal for channel state information (CSI-RS) into the transmission data multiplied by the transmission weight. The CSI-RS multiplexing section 10033 outputs the multiplexed transmission data to the IFFT section 10032.

The IFFT section 10032 performs IFFT on the multiplexed transmission data to transform into the signal in the time domain. The IFFT section 10032 outputs the IFFT-processed signal to the CP adding section 10031. The CP adding section 10031 adds a CP to the IFFT-processed signal. The signal with the CP added in each transmission signal processing section 1003 is MU-MIMO transmitted to each mobile terminal from each antenna 1001 via the duplexer 1002 in downlink.

A signal transmitted from a mobile terminal in uplink is received in the control information reception section 1006 via each antenna 1001. The control information reception section 1006 divides the signal into uplink reception data and control information, and outputs the control information (feedback information) to the transmission weight generating section 1007 and transmission data generating section 1005. In other words, the control information reception section 1006 outputs the spatial channel information of the feedback information to the transmission weight generating section 1007, and outputs the CQI of the feedback information to the transmission data generating section 1005.

Figure 5:
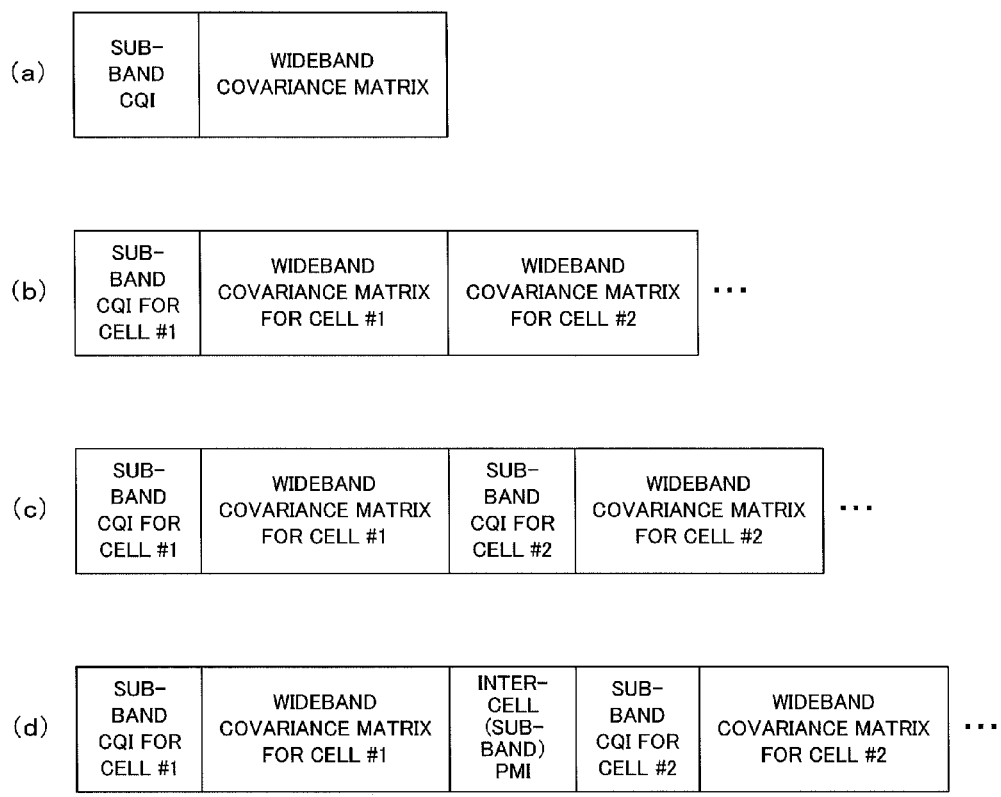
FIGS. 5(a) to 5(d) are diagrams to explain CSI feedback information used in the radio communication method according to the Embodiment of the invention.
Figure 6:
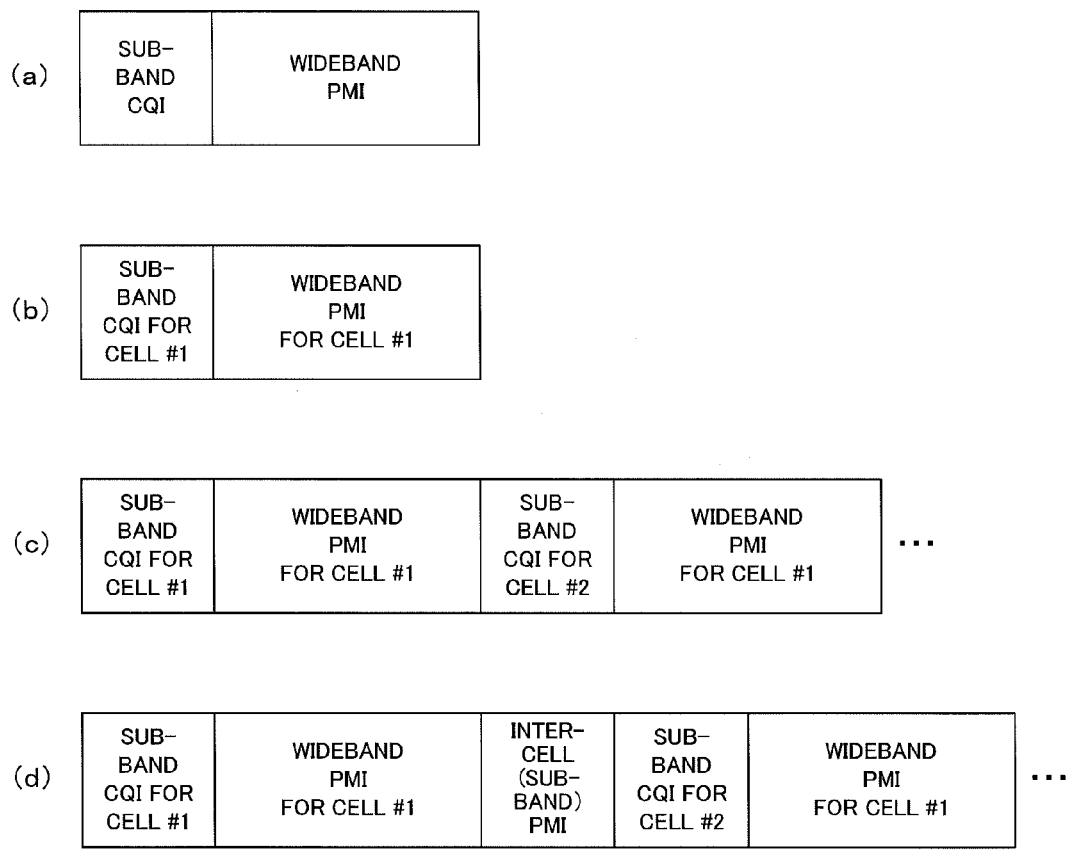
FIGS. 6(a) to 6(d) are diagrams to explain the CSI feedback information used in the radio communication method according to the Embodiment of the invention.
Figure 7:
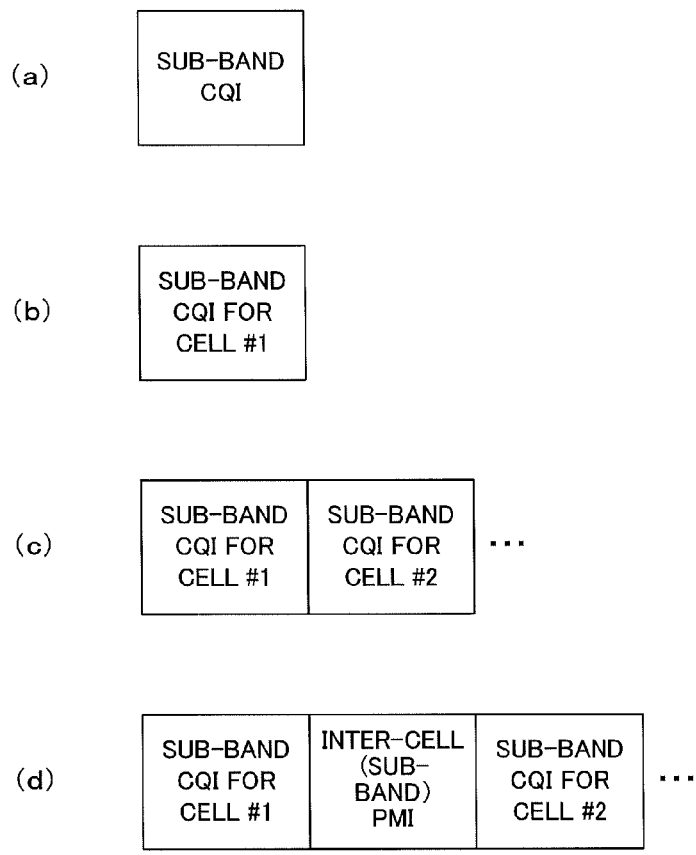
FIGS. 7(a) to 7(d) are diagrams to explain the CSI feedback information used in the radio communication method according to the Embodiment of the invention.
Figure 8:
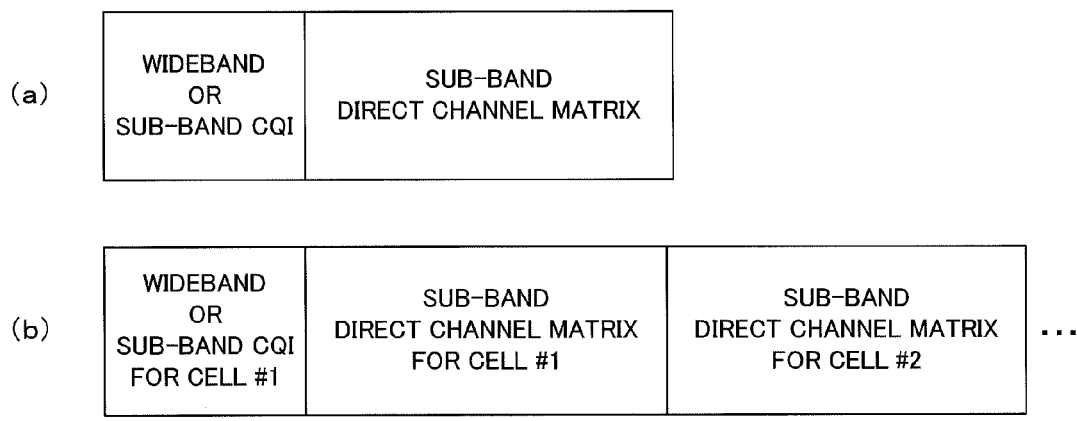
FIGS. 8(a) and 8(b) are diagrams to explain the CSI feedback information used in the radio communication method according to the Embodiment of the invention.

The feedback information transmitted from the mobile terminal as feedback has the format, for example, as shown in FIGS. 5 to 8 corresponding to the report mode. In other words, the feedback information is extended by the level corresponding to the report mode. For example, when the report mode is mode 3-1 in FIG. 4, the formats extended as shown in FIGS. 5(*a*) to 5(*d*) or FIGS. 6(*a*) to 6(*d*) are used. Meanwhile, when the report mode is mode 1-2 or mode 2-2 in FIG. 4, the formats extended as shown in FIGS. 8(*a*) and 8(*b*) are used. Further, when the report mode is mode 2-0 or mode 3-0 in FIG. 4, the formats as shown in FIGS. 7(*a*) to 7(*d*) are used. Moreover, in the formats as shown in FIGS. 5 to 8, the format is selected corresponding to the form of CoMP transmission.

In generation of the transmission data, the transmission data generating section 1005 performs adaptive modulation/demodulation and coding processing (AMC) using the CQI from the control information reception section 1006. Further, the transmission weight generating section 1007 generates transmission weights using the spatial channel information from the control information reception section 1006. At this point, when the spatial channel information is the explicit information, for example, the covariance matrix, the section 1007 multiplies the covariance matrix by precoding gain to generate transmission weights. Meanwhile, when the spatial channel information is the implicit information, for example, the PMI, the section 1007 selects transmission weights corresponding to the PMI from a codebook.

Figure 11:
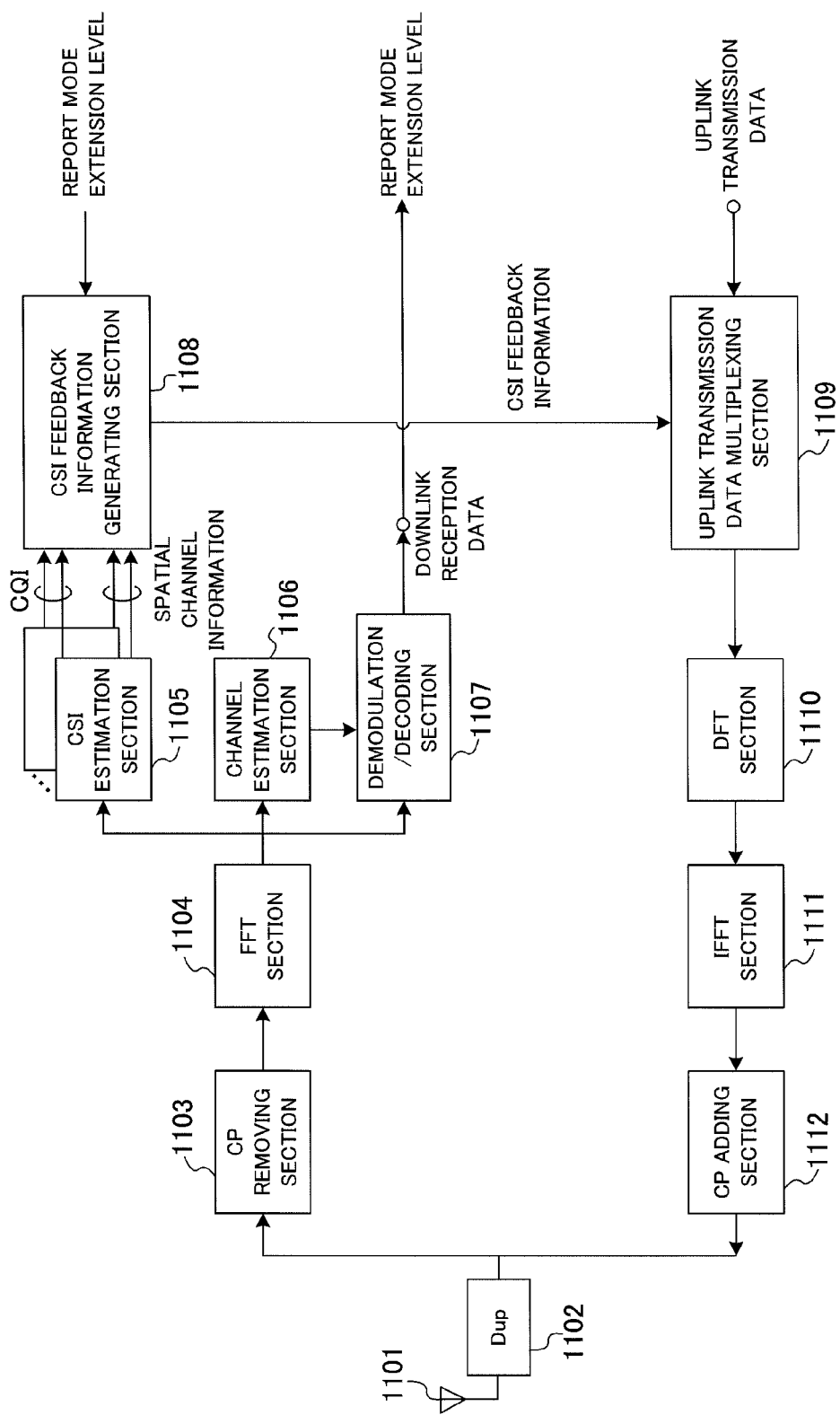
FIG. 11 is a block diagram illustrating a schematic configuration of the mobile terminal apparatus according to the Embodiment of the invention.

FIG. 11 is a diagram illustrating a configuration of a mobile terminal apparatus according to the Embodiment of the invention. The mobile terminal apparatus as shown in FIG. 11 has an antenna 1101, a duplexer 1102 that switches between transmission and reception, a CP removing section 1103 that removes a CP from a reception signal, an FFT section 1104 that performs Fast Fourier Transform (FFT) operation on the reception signal, CSI estimation sections 1105 that estimate CSIs using CSI-RSs, a channel estimation section 1106 that performs channel estimation using a DM-RS, a demodulation/decoding section 1107 that demodulates and decodes reception data using a channel estimation value, a CSI feedback information generating section 1108 that generates CSI feedback information from a CSI estimation value and report mode/extension level, an uplink transmission data multiplexing section 1109 that multiplexes uplink transmission data and the CSI feedback information, a DFT section 1110 that performs Discrete Fourier Transform (DFT) operation on the multiplexed signal, an IFFT section 1111 that performs IFFT operation on the DFT-processed transmission data, and a CP adding section 1112 that adds a CP to the IFFT-processed signal. The CSI estimation sections 1105 are provided corresponding to the number of cells coordinating for CoMP transmission.

A signal transmitted from the base station apparatus in downlink is received in the reception section via each antenna 1101. The CP removing section 1103 in the reception section removes a portion corresponding to the CP from the reception signal, and extracts an effective signal portion. The CP removing section 1103 outputs the CP-removed signal to the FFT section 1104. The FFT section 1104 performs FFT on the CP-removed signal to transform into the signal in the frequency domain. The FFT section 1104 outputs the FFT-processed signal to the CSI estimation sections 1105, channel estimation section 1106 and demodulation/decoding section 1107. The CSI-RS is output to the CSI estimation sections 1105, the DM-RS is output to the channel estimation section 1106, and the reception data is output to the demodulation/decoding section 1107.

Each of the CSI estimation sections 1105 estimates a channel variation using the CSI-RS, and compensates for the estimated channel variation to obtain the CSI (CQI, spatial channel information). Further, each of the CSI estimation sections 1105 outputs the obtained CSI (CQI, spatial channel information) to the CSI feedback information generating section 1108. In other words, the CSI estimation sections 1105 corresponding to the number of cells coordinating for CoMP transmission output CSI (CQI, spatial channel information) respectively compensated for channel variations to the CSI feedback information generating section 1108.

The channel estimation section 1106 estimates the channel variation using the DM-RS, and outputs the estimated channel variation result to the demodulation/decoding section 1107. The demodulation/decoding section 1107 compensates for the channel variation estimated in the channel estimation section 1106 to obtain downlink reception data. The downlink reception data includes the report mode and the extension level. The report mode and the extension level are output to the CSI feedback information generating section 1108.

The CSI feedback information generating section 1108 generates the CSI feedback information associated with the report mode and the extension level. The CSI feedback information generating section 1108 outputs the CSI feedback information to the uplink transmission data multiplexing section 1109. The CSI feedback information has the format, for example, as shown in FIGS. 5 to 8 corresponding to the report mode. In other words, the feedback information is extended by the level corresponding to the report mode. For example, when the report mode is mode 3-1 in FIG. 4, the formats extended as shown in FIGS. 5(*a*) to 5(*d*) or FIGS. 6(*a*) to 6(*d*) are used. Meanwhile, when the report mode is mode 1-2 or mode 2-2 in FIG. 4, the formats extended as shown in FIGS. 8(*a*) and 8(*b*) are used. Further, when the report mode is mode 2-0 or mode 3-0 in FIG. 4, the formats as shown in FIGS. 7(*a*) to 7(*d*) are used. Moreover, in the formats as shown in FIGS. 5 to 8, the format is selected corresponding to the form of CoMP transmission.

The uplink transmission data multiplexing section 1109 multiplexes the CSI feedback information into the uplink transmission data. The uplink transmission data multiplexing section 1109 outputs the multiplexed transmission data to the DFT section 1110. The DFT section 1110 performs DFT on the multiplexed transmission data, and outputs the DFT-processed transmission data to the IFFT section 1111. The IFFT section 1111 performs IFFT on the DFT-processed signal to transform into the signal in the time domain. The IFFT section 1111 outputs the IFFT-processed signal to the CP adding section 1112. The CP adding section 1112 adds a CP to the IFFT-processed signal. The CP-added signal is transmitted to the base station apparatus from the antenna 1101 via the duplexer 1102 in uplink.

Described is a radio communication method in the radio base station apparatuses and mobile terminal apparatuses having the above-mentioned configurations.

First, the transmission data generating section 1005 in the base station apparatus generates downlink transmission data including the report mode corresponding to the bandwidth to perform feedback of the feedback information and the extension level of the feedback information. The feedback information includes the CQI and the spatial channel information. Then, the DM-RS and CSI-RS are multiplexed into the downlink transmission data including the report mode and the extension level, and the data is transmitted to the mobile terminal in downlink.

The mobile terminal receives the downlink signal including the report mode and the extension level. Among the downlink signal, the report mode and the extension level transmitted by Higher layer signaling are output to the CSI feedback information generating section 1108. The CSI feedback information generating section 1108 generates the feedback information associated with the report mode and the extension level. At this point, as described above, the CSI feedback information has the format, for example, as shown in FIGS. 5 to 8 corresponding to the report mode. The mobile terminal transmits uplink transmission data including the feedback information of such a format to the base station apparatus in uplink. The base station apparatus receives the uplink transmission data including the feedback information transmitted in uplink, performs adaptive modulation/demodulation and coding processing (AMC) using the CQI of the feedback information, and generates transmission weights using the spatial channel information of the feedback information.

Thus, according to the radio communication method of the invention, the extended feedback information is used which includes the channel quality information (CQI) and the spatial channel information, and it is thereby possible to sufficiently support MU-MIMO transmission and CoMP transmission in the LTE-A systems.

The invention is not limited to the aforementioned Embodiment, and is capable of being carried into practice with various modifications thereof. The above-mentioned Embodiment describes the report mode of a combination of the CQI and the spatial channel information as shown in FIG. 4, but the invention is not limited thereto, and is similarly applicable to other report modes in combination of the CQI and the spatial channel information. Further, the above-mentioned Embodiment describes the formats as shown in FIGS. 5 to 8, but the invention is not limited thereto, and is similarly applicable to the cases of using formats of the feedback information other than the formats as shown in FIGS. 5 to 8. Furthermore, without departing from the scope of the invention, the number of processing sections and processing procedures in the above-mentioned description are capable of being carried into practice with modifications thereof as appropriate. Still furthermore, each element shown in the figures represents the function, and each function block may be actualized by hardware or may be actualized by software. Moreover, the invention is capable of being carried into practice with modifications thereof as appropriate without departing from the scope of the invention.

INDUSTRIAL APPLICABILITY

The invention is useful in the radio base station apparatus, mobile terminal apparatus and radio communication method in the LTE-A systems.

The present application is based on Japanese Patent Application No. 2009-231962 filed on Oct. 5, 2009, entire content of which is expressly incorporated by reference herein.

The invention claimed is:

1. A radio communication system comprising:
 a report mode used by the system of CSI (Channel State Information) defined by a combination of a CQI (Channel Quality Indicator) and a PMI (Precoding Matrix Indicator), the report mode being signaled by higher layer signaling, wherein
 the report mode is defined by the combination including the PMI that changes in number of bits with an extension level,
 multiple CSI are configured by higher layer signaling in CoMP (Coordinated Multiple Point Transmission/Reception) transmission,
 when feeding back the PAC, the report mode is mode 1-2, mode 2-2 or mode 3-1, and
 in the mode 1-2, the PMI is combined with wide-band CQI, in the mode 2-2, the PMI is combined with sub-band CQI selected by a mobile terminal apparatus, and, in the mode 3-1, the PMI is combined with sub-band COT configured by higher layers.

2. The radio communication system according to claim 1, wherein the report mode of CSI is defined by the combination including sub-band CQI and sub-band PMI.

3. A mobile terminal apparatus in a radio communication system comprising a report mode used by a system of CSI (Channel State Information) defined by a combination of a CQI (Channel Quality Indicator) and a PMI (Precoding Matrix Indicator), the report mode being signaled by higher layer signaling, wherein
 the report mode is defined by the combination including the PMI that changes in number of bits with an extension level,
 multiple CSI is are configured by higher layer signaling in CoMP (Coordinated Multiple Point Transmission/Reception) transmission,
 when feeding back the PMI, the report mode is mode 1-2, mode 2-2 or mode 3-1, and
 in the mode 1-2, the PMI is combined with wide-band CQI, in the mode 2-2, the PMI is combined with sub-band CQI selected by the mobile terminal apparatus, and, in the mode 3-1, the PMI is combined with sub-band CQI configured by higher layers.

4. A radio base station apparatus in a radio communication system comprising a report mode used by a system of CSI (Channel State Information) defined by a combination of a CQI (Channel Quality Indicator) and a PMI (Precoding Matrix Indicator), the report mode being signaled by higher layer signaling, wherein
  the report mode is defined by the combination including the PMI that changes in number of bits with an extension level,
  multiple CSI are configured by higher layer signaling in CoMP (Coordinated Multiple Point Transmission/Reception) transmission,
  when feeding back the PMI, the report mode is mode 1-2, mode 2-2 or mode 3-1, and
  in the mode 1-2, the PMI is combined with wide-band CQI, in the mode 2-2, the PMI is combined with sub-band CQI selected by a mobile terminal apparatus, and, in the mode 3-1, the PMI is combined with sub-band CQI configured by higher layers.

5. A radio communication method, comprising,
  in a radio communication system using a report mode, by the radio communication system, of CSI (Channel State Information) defined by a combination of a CQI (Channel Quality Indicator) and a PMI (Precoding Matrix Indicator), the report mode being signaled by higher layer signaling, wherein
  the report mode is defined by the combination including the PMI that changes in number of bits with an extension level,
  multiple CSI are configured by higher layer signaling in CoMP (Coordinated Multiple Point Transmission/Reception) transmission,
  when feeding back the PMI, the report mode is mode 1-2, mode 2-2 or mode 3-1, and
  in the mode 1-2, the PMI is combined with wide-band CQI, in the mode 2-2, the PMI is combined with sub-band CQI selected by a mobile terminal apparatus, and, in the mode 3-1, the PMI is combined with sub-band CQI configured by higher layers.

\* \* \* \* \*